United States Patent
Shimada et al.

(10) Patent No.: US 7,142,930 B2
(45) Date of Patent: Nov. 28, 2006

(54) DISTURBANCE ESTIMATED TYPE CONTROL SYSTEM, GAS COMPRESSOR CONTROL SYSTEM AND METHOD OF DESIGNING A DISTURBANCE ESTIMATED TYPE CONTROL SYSTEM

(75) Inventors: Akira Shimada, Chiba (JP); Kenzou Nonami, Chiba (JP)

(73) Assignee: Calsonic Compressor Manufacturing Inc. (JP)

( * ) Notice: Subject to any disclaimer, the term of this patent is extended or adjusted under 35 U.S.C. 154(b) by 659 days.

(21) Appl. No.: 10/027,362

(22) Filed: Dec. 26, 2001

(65) Prior Publication Data

US 2002/0128730 A1 Sep. 12, 2002

(30) Foreign Application Priority Data

Dec. 28, 2000 (JP) ............................. 2000-401397

(51) Int. Cl.
*G06F 9/00* (2006.01)
*G06F 17/00* (2006.01)

(52) U.S. Cl. ..................... 700/29; 700/30; 700/31

(58) Field of Classification Search ............ 700/27–33; 701/100; 165/271; 62/239, 244
See application file for complete search history.

(56) References Cited

U.S. PATENT DOCUMENTS

| | | | | |
|---|---|---|---|---|
| 4,316,251 A | * | 2/1982 | Saito et al. ................... 701/36 |
| 4,408,278 A | * | 10/1983 | Saito et al. ................. 165/204 |
| 5,115,418 A | | 5/1992 | Shimada ..................... 318/616 |
| 5,483,438 A | * | 1/1996 | Nishimura ................... 700/29 |
| 5,489,829 A | | 2/1996 | Umida ........................ 318/561 |
| 5,547,296 A | * | 8/1996 | Iwazawa ..................... 400/322 |
| 5,719,479 A | * | 2/1998 | Kato et al. ................... 318/563 |
| 5,734,242 A | * | 3/1998 | Iwashita ...................... 318/434 |
| 5,959,861 A | * | 9/1999 | Kaneko ........................ 700/29 |
| 6,056,781 A | | 5/2000 | Wassick et al. ............... 703/12 |
| 6,094,602 A | * | 7/2000 | Schade, III .................. 700/45 |
| 6,411,461 B1 | * | 6/2002 | Szita ....................... 360/77.07 |
| 6,505,475 B1 | * | 1/2003 | Zugibe et al. ................ 62/192 |
| 6,564,110 B1 | * | 5/2003 | Makino et al. ............... 700/56 |
| 6,567,711 B1 | * | 5/2003 | Hosek et al. ................. 700/55 |

FOREIGN PATENT DOCUMENTS

| | | | |
|---|---|---|---|
| EP | 0845722 | | 6/1998 |
| EP | 0872785 | | 10/1998 |
| JP | 401175518 A | * | 7/1989 |
| JP | 02001227825 A | * | 8/2001 |
| JP | 02001227826 A | * | 8/2001 |

* cited by examiner

OTHER PUBLICATIONS

A. Kawata et al: "Power-Frequency Characteristics and Load Disturbance Estimation by Extended Kalman Filter" Memoirs of the Faculty of Engineering, Kobe University, No. 37, 1990, pp. 179-186, XP002235152 Japan.

*Primary Examiner*—Anthony Knight
*Assistant Examiner*—Michael B. Holmes
(74) *Attorney, Agent, or Firm*—Adams & Wilks

(57) ABSTRACT

A disturbance estimated-type control system has a control object based on a mathematical model having of one of a state equation and a transfer function and prepared by system identification technology. A disturbance estimating device is based on an expansion system based on the mathematical model for estimating a disturbance of the control object in accordance with an input signal inputted into the control object and a detection signal detected from the control object. A compensating device is based on the mathematical model for compensating for a deviation between the detection signal and a target value and for outputting a corresponding control signal. A subtractor subtracts the control signal of the compensating device from a disturbance estimated value of the disturbance estimating device.

6 Claims, 13 Drawing Sheets

← FLOW OF REFRIGERANT
← FLOW OF CONTROL SIGNAL

51 OUTLET OF THE
   EVAPORATOR

65 SIGNAL-AMPLIFIED BY
   A CAPACITY CONTROL
   SIGNAL GENERATING CIRCUIT

DISTURBANCE ESTIMATED TYPE CONTROL SYSTEM, GAS COMPRESSOR CONTROL SYSTEM AND METHOD OF DESIGNING A DISTURBANCE ESTIMATED TYPE CONTROL SYSTEM

BACKGROUND OF THE INVENTION

1. Field of the Invention

The present invention concerns a disturbance estimated-type control system, a gas compressor control system and a method of designing a disturbance estimated type control system and, in particular, relates to a disturbance estimated type control system and a gas compressor control system that are insensitive to parameter variations, such as a heat load variation and rotating speed change, and to a method of designing the disturbance estimated type control system.

2. Description of the Related Art

Displacement control of a refrigeration air conditioning system for a car air conditioner is for observing an air temperature at an outlet of an evaporator or a room temperature by a temperature sensor and changing a displacement of a gas compressor such that the observed temperature coincides with a target temperature set in advance.

Alternatively, the displacement of the gas compressor is changed such that a refrigerant suction pressure of the gas compressor becomes a desired pressure value. For example, in Japanese Patent No. 1746774, displacement control is performed using rotating speed information of a gas compressor together with air temperature information.

An overall schematic configuration view of the air conditioning system is shown in FIG. 12. The air conditioning system is mounted, for example, on a car. In FIG. 12, an evaporator 51 is a heat exchanger involving ventilation by a fan 52 and cools air in a cabin. Refrigerant gas that is evaporated within the evaporator 51 is taken into a variable displacement type gas compressor 10 and pressurized to be sent to a condenser 53.

In the condenser 53, the refrigerant gas is liquidized and heat absorbed from the inside of the cabin is discharged to the outside of the car. An expansion valve 54 is made to rapidly decrease a pressure of the refrigerant gas from a high pressure to a low pressure. A rotating shaft 11 of the variable displacement type gas compressor 10 is made such that a shaft power of an engine 59 is transmitted to it and it is rotationally driven.

A sectional view of the variable displacement type gas compressor 10 is shown in FIG. 13 and a sectional view cut along line A—A and viewed in the direction of arrows A in FIG. 13 of the variable displacement type gas compressor 10 is shown in FIG. 14.

A suction port 1 of the variable displacement type gas compressor 10 is made to suction refrigerant gas from the evaporator 51 connected to the outside.

A cylinder 3 is clamped between a front head 5 and a rear side block 7. A rotor 9 is rotatably arranged within the cylinder 3.

The rotor 9 is penetrated by and fixed to a rotary shaft 11. Bane grooves 13 are formed in the radial direction on the external circumference of the rotor 9 and banes 15 are slidably inserted in the bane grooves 13. Then, the banes 15 are biased to the internal wall of the cylinder 3 by a centrifugal force and an oil pressure of the bottoms of the bane grooves 13 when the rotor 9 is rotating.

The inside of the cylinder 3 is partitioned into a plurality of small chambers by the rotor 9 and the banes 15. These small chambers are referred to as compressing chambers 17, which repeat increasing and decreasing changes of a displacement by the rotation of the rotor 9.

Then, when the rotor 9 rotates to change the displacement of the compressing chambers 17 in this way, low-pressure refrigerant gas is taken in from the suction port 1 and compressed by the displacement change. A case 19 is fixed in the peripheral end portion of the cylinder 3 and the rear side block 7 and a discharge chamber 21 is formed inside this case 19.

High-pressure refrigerant gas compressed in the compressing chamber 17 is sent to the discharge chamber 21 via a discharge port 23 and a discharge valve 25. Then, the refrigerant gas is sent to the condenser 53 in the outside from the discharge chamber 21 via the discharge port 27.

This variable displacement type gas compressor 10 is provided with a displacement varying mechanism 30. This displacement varying mechanism 30 is made such that it can variably adjust a discharge capacity of refrigerant gas according to a temperature in a cabin. An example of a configuration of the displacement varying mechanism 30 is shown in FIG. 15.

A control plate 29 is arranged in the front head 5 to face the side portion of the cylinder 3. Notches 29a are provided in two parts of the control plate 29. These notches 29a cause the inside of the cylinder 3 and a suction chamber 31 leading to the suction port 1 to communicate with each other. On the other hand, the compressing chambers 17 are formed in spaces closed by the part on the control plate 29 where there is no notch, the internal wall of the cylinder 3 and the banes 15.

When the control plate 29 is rotated to the right, the notches 29a are rotated in the right direction, whereby the positions where the compressing chambers 17 are formed also move to the right side and the displacement of the compressing chambers 17 at this point is also reduced. In this way, a discharge capacity is adjustable by rotating the control plate 29.

The rotation of the control plate 29 is performed by a driving shaft 39 of hydraulic drive via a pin 33. Oil is injected into a sleeve 35 from the discharge chamber 21 by adjusting the opening degree of a control valve 37 and the driving shaft 39 is moved straight by oil pressure at this point. Then, this straight movement is converted into rotating movement via the pin 33 to cause the control plate 29 to rotate.

An injection amount of oil can be changed by altering the opening degree of the control valve 37. This alteration of the opening degree is performed by changing a displacement control command value (duty ratio) shown in FIG. 16.

The control plate 29 is rotated under the balance with an elastic force by a spring 38 in accordance with a differential pressure between a control pressure Pc in the sleeve 35 and a pressure Ps in the suction chamber 31.

Further, in FIG. 12, for example, in order to detect an air temperature at the outlet of the evaporator 51, a temperature sensor 55 is disposed. In addition, in order to detect a rotating speed of the engine 59, a rotating speed sensor 57 is disposed.

Then, a displacement control command value is calculated in a control circuit 61 based on a detected signal of this temperature sensor 55 and a rotating speed of the engine 59.

This displacement control command value is signal-amplified by a displacement control signal generating circuit 65 and, then, transmitted to the control valve 37 of the displacement varying mechanism 30.

Next, a control method of this displacement varying mechanism 30 will be described based on a flow chart of FIG. 17.

For simplicity, description will be made with the case in which a displacement of the variable displacement type gas compressor 10 is reduced such as the case in which a rotating speed of the engine 59 is increased as an example.

Now, the case in which a detected temperature at the outlet of the evaporator 51 has become lower than a target temperature 67 at the outlet of the evaporator 51 is assumed. In this case, in order to prevent the inside of the cabin from being cooled excessively, it is necessary to lower cooling capability.

First, in step 1 (it is abbreviated as S1 in the figure and the same is true for subsequent steps), a target refrigerant flow rate of the variable displacement type gas compressor 10 is calculated based on a temperature deviation between a target temperature and a detected temperature. The calculation in this case is performed by PID control or the like. Next, in step 3, a rotating speed of the variable displacement type gas compressor 10 is calculated from this calculated target refrigerant flow rate or a discharge capacity of the variable displacement type gas compressor 10 is calculated taking a rotating speed of the engine 59 into account.

In step 5, a rotating speed correcting calculation is performed from this discharge capacity based on a not-shown property curve showing a relation between a discharge capacity and a displacement control command value and a displacement control command value by which an opening degree of the control valve 37 should be adjusted is determined. The displacement control command value at this point is commanded to be small. As a result, an average current falls in step 7 and the opening degree of the control valve 37 is reduced in step 9.

At this point, the control pressure Pc inside the sleeve 35 falls in step 11. Thus, the driving shaft 39 is moved downward in step 13 and the control plate 29 rotates to the right in step 15. As a result, the discharge capacity of the variable displacement type gas compressor 10 becomes small in step 17 and the cooling capability falls.

In addition, other than the above-described control method, methods such as a method of preparing a plurality of control modes and switching among the modes and a method of altering a model based on observation information and changing a parameter of a compensator according the model alteration have been used because the air conditioning system has different physical property depending on a heat load variation and a difference of an operation condition and also has strong nonlinearity (Japanese Patent Nos. 2090676 and 2086982).

However, the embodiment according to Japanese Patent No. 1746774 increases the number of sensors because a rotating speed sensor is required. In addition, even if an existing rotating speed sensor is used, there is a disadvantage in that the number of communication means increases. Thus, although a technology for realizing equivalent or higher control performance even without rotating speed information is necessary, the realization has been difficult conventionally.

On the other hand, in the case of Japanese Patents Nos. 2090676 and 2086982, providing a plurality of control compensators leads to increase of development load. In addition, alteration of a compensator is likely to cause trouble in practical use because there arise problems in that the number of sensors is increased, development load is increased and the compensator itself becomes complex.

The present invention has been devised in view of such conventional problems and it is an object of the present invention to provide a disturbance estimated type control system and a gas compressor control system that are insensitive to parameter variations, such as a heat load variation and a rotating speed change, and to a method of designing a disturbance estimated type control system.

SUMMARY OF THE INVENTION

Therefore, according to the present invention, there is provided a disturbance estimated type control system, comprising: a control object; disturbance estimating means for estimating a disturbance added to an input of the control object based on an input signal to be inputted in the control object and a detection signal detected from the control object; compensating means for compensating for the detection signal and outputting a control signal; and calculating means for subtracting a disturbance estimated by the disturbance estimating means from the control signal and considering a subtraction result as the input signal, characterized in that a mathematical model (nominal model) of the control object comprising of a state equation and a transfer function is prepared by system identification based on an experiment, the compensating means is designed from the mathematical model (nominal model), and the disturbance estimating means is prepared from an expanded state equation (expansion system) comprising of a mathematical model (expansion model) taking a disturbance into account with respect to the mathematical model (nominal model).

A nominal model of a system is prepared utilizing a system identification technology. Then, disturbance estimating means is prepared from an expanded state equation (expansion system) comprising of a mathematical model (expansion model) taking a disturbance into account with respect to this mathematical model (nominal model).

A disturbance against a control object can be offset by subtracting a disturbance estimated by the disturbance estimating means from a control signal that is an output of compensating means. Thus, a system control system insensitive to a parameter variation caused by a change in physical property can be realized with a fixed compensator having a simple structure.

Further, the present invention is configured by comprising: a variable displacement type gas compressor having displacement altering means that is capable of altering a displacement within a compressing chamber; an input signal to be inputted in the displacement altering means; a detection signal in which at least one piece of information among an air temperature in a room, an air temperature at an outlet of an evaporator, a refrigerant flow, a refrigerant pressure on a suction side of a gas compressor and the like is detected; disturbance estimating means for estimating a disturbance of the variable displacement type gas compressor based on the detection signal and the input signal; compensating means for compensating for the detect ion signal to output a control signal; and calculating means for subtracting a disturbance estimated by the disturbance estimating means from the control signal to consider a subtraction result the input signal.

A disturbance is, for example, a variation of a fan ventilating an evaporator, a variation of the number of rotations of a variable displacement type gas compressor that is driven by an engine, or the like. A refrigeration air conditioning system control system, which is insensitive to a parameter variation caused by the change in physical property values of air and refrigerant due to a heat load variation and the change in refrigerant flow due to a variation of the number of rotations, can be realized with fixed compensating means having a simple structure.

Further, according to the present invention, there is provided with a method of designing a disturbance estimated type control system that comprises: a control object; disturbance estimating means for estimating a disturbance added to an input of the control object based on an input signal to be inputted in the control object and a detection signal detected from the control object; compensating means for compensating for the detection signal and outputting a control signal; and calculating means for subtracting a disturbance estimated by the disturbance estimating means from the control signal and considering a subtraction result as the input signal, characterized by comprising: preparing a mathematical model (nominal model) of the control object comprising of a state equation and a transfer function by system identification; preparing an expanded state equation (expansion system) comprising of the mathematical model and a mathematical model of a disturbance; designing the disturbance estimating means from the state equation (expansion system); and designing the compensating means from the mathematical model (nominal model).

Further, the present invention is characterized by comprising: determining whether or not the state equation (expansion system) is observable; and if it is determined to be unobservable, compulsorily adding an error of 10% or less to a coefficient corresponding to an A matrix and/or a C matrix of the state equation (expansion system) or a zero-th dimension term of a transfer function numerator and preparing an expansion system including the error, thereby establishing observability.

In this way, the disturbance estimating means and the compensating means can be designed even if the state equation (expansion system) is unobservable.

DESCRIPTION OF THE PREFERRED EMBODIMENT

Figure 1:
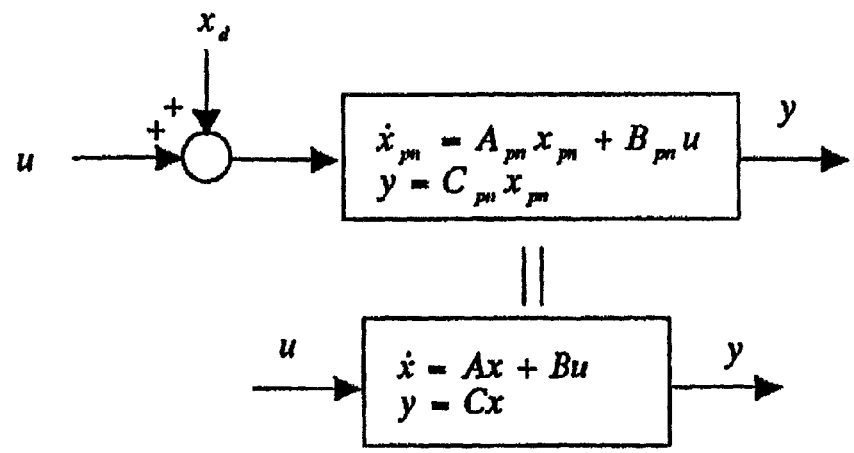
FIG. 1 is a block diagram of an expansion system including a nominal model and a disturbance.

Embodiments of the present invention will be hereinafter described.

The present invention is for applying a disturbance observer whose effectiveness is confirmed in a mechanical system such as a robot and a machine tool (see Kohei Ohnishi, Kiyoshi Ohishi, Kunio Miyaji: "A control method of a separate excitation DC machine using a state observer", the Institute of Electrical Engineers of Japan Thesis Magazine B104–6, pp. 373–379, 1984) to displacement control of a refrigeration air conditioning system.

Its characteristic is that it is insensitive to a variation despite the fact that it is a compensator of a fixed gain and, moreover, a simple compensator of low dimension. However, even if it is attempted to apply a technology of another field of application to the refrigeration air conditioning system and divert it to the field, even a nominal model that becomes a premise of designing a disturbance observer cannot be easily prepared because the refrigeration air conditioning system is complicated and has strong nonlinearity. That is, the disturbance observer technology that has been used for a motor cannot be diverted without change.

Thus, the system identification technology is utilized to prepare a nominal model of a refrigeration air conditioning system, an expansion system comprising of the nominal model and a newly assumed disturbance is configured and, after confirming conditions for the expansion system to meet observability that is a configuration condition of an observer, a new disturbance observer is designed to make it possible to mount it on an actual machine.

Incidentally, the term "nominal", which means "in name only", is based on the fact that, since an actual system varies, a mathematical model is not limited to its mathematical model. Here, it refers to a model that is found according to one average condition.

First, a method of obtaining a nominal model will be described.

It is assumed that a refrigeration air conditioning system is modeled as in the following expressions 1 and 2 by means such as system identification.

$$\dot{x} A_{pn} x_{pn} + B_{pn} u \qquad \text{[Expression 1]}$$

$$y = C_{pn} x_{pn} \qquad \text{[Expression 2]}$$

However, it is assumed to be an actual vector or an actual matrix of $x_{pn}(n_{pn} \times 1), u(1 \times 1), y(1 \times n_{pn})$, $A_{pn}(n_{pn} \times n_{pn}), B_{pn}(n_{pn} \times 1), C_{pn}(1 \times n_{pn})$.

Here, the input u is a driving input signal of an actuator for causing a displacement of a variable displacement type gas compressor to change and is a voltage in most cases, but may be variable data or the like that plays the same role inside a computer system for control.

In addition, the output y is a detected value of an air temperature of a part that is to be controlled and is observed in the form of a voltage in most cases, but may be variable data corresponding to the temperature captured into a computer for control.

Whichever it is, the above-described model is a model under a certain condition and does not include a physical parameter variation or a disturbance. This is referred to as a nominal model.

Next, a method of the system identification will be described.

The system identification per se is a conventional modeling theory and technology (see, for example, Shuichi Adachi: System identification for control by MATLAB, Tokyo Denki University Press, 1996). There are known a prediction error method, a maximum likelihood estimation method, a least-square method, a subspace identification method and the like, and it is assumed that any method may be used but representation is finally made in the form of a state equation.

In addition, since an identified model is a model that should also have been found by an experiment using input and output, it is controllable and observable (see, for example, Kosato, Mita: Guide to system control theory, Jikkyo Shuppan Co., Ltd., 1979). Conversely, even if there is an uncontrollable or unobservable part in an actual system, modeling is performed with that part neglected.

In the case of a one-output system, a necessary and sufficient condition of controllability is that a rank of a controllable matrix $U_{Cpn}(n_{pn} \times n_{pn})$ of the following expression 3 is $n_{pn}$.

$$U_{Cpn}=[B_{pn}, A_{pn}B_{pn}, A_{pn}^2 B_{pn}, \ldots, A_{pn}^{n_{pn}-1}B_{pn}] \quad \text{[Expression 3]}$$

Then, $\text{rank}(U_{Cpn})=n_{pn}$, that is, $$\det(U_{Cpn}) \neq 0 \quad \text{[Expression 4]}$$

In the case of a one-output system, a necessary and sufficient condition of observability is that a rank of an observable matrix $U_{opn}(n_{pn} \times n_{pn})$ of the following expression 5 is $n_{pn}$.

$$U_{Opn}=[C_{pn}, C_{pn}A_{pn}, C_{pn}A_{pn}^2, \ldots, C_{pn}A_{pn}^{n_{pn}-1}]^T \quad \text{[Expression 5]}$$

Then, $\text{rank}(U_{Opn})=n_{pn}$, that is, $$\det(U_{Opn}) \neq 0 \quad \text{[Expression 6]}$$

It is assumed that the above expression is established.

Next, preparation of a model and confirmation of observability taking a disturbance into account will be described.

Correction taking a disturbance into account is added to the above-described nominal model.

A parameter variation and an unknown external input are collectively considered a disturbance d at an input end to define a new state amount $x_{c1}=d$ and prepare expansion systems of a state equation Expressions 7 and 8.

$$\dot{x}=Ax+Bu \quad \text{[Expression 7]}$$

$$y=Cx \quad \text{[Expression 8]}$$

Here, Expression 9 is assumed.

$$\dot{x}_d=0 \quad \text{[Expression 9]}$$

Here, each element is $$x = \begin{bmatrix} x_{pn} \\ x_d \end{bmatrix}, A = \begin{bmatrix} A_{pn} & B_{pn} \\ 0_{1 \times n_{pn}} & 0 \end{bmatrix}, B = \begin{bmatrix} B_{pn} \\ 0 \end{bmatrix}, C = [C_{pn}\ 0] \quad \text{[Expression 10]}$$

A dimension of the system is $n=n_{pn}+1$ at $A((n_{pn}+1) \times (n_{pn}+1)), B((n_{pn}+1) \times 1), C(1 \times (n_{pn}+1))$.

A block diagram of an expansion system including a nominal model and a disturbance is shown in FIG. 1. It is known that, if Expressions 7 and 8 are observable, an observer can be designed. A necessary and sufficient condition of observability is that, in the case of a one-output system, a rank of an observable matrix $U_o(n \times n)$ of the following Expression 11 is n.

$$U_0=[C, CA, CA^2, \ldots, CA^{n-1}]^T \quad \text{[Expression 11]}$$

That is, Expression 12 must be established.

$$\det(U_0) \neq 0 \quad \text{[Expression 12]}$$

In the case of this system, an observable matrix is found to be Expression 14 from Expression 13.

$$CA = [C_{pn}\ 0]\begin{bmatrix} A_{pn} & B_{pn} \\ 0_{1 \times n_{pn}} & 0 \end{bmatrix} = [C_{pn}A_{pn}\ C_{pn}B_{pn}] \quad \text{[Expression 13]}$$

$$CA^2 = [C_{pn}A_{pn}\ C_{pn}B_{pn}]\begin{bmatrix} A_{pn} & B_{pn} \\ 0_{1 \times n_{pn}} & 0 \end{bmatrix} = [C_{pn}A_{pn}^2\ C_{pn}A_{pn}B_{pn}]$$

$$CA^3 = [C_{pn}A_{pn}^2\ C_{pn}A_{pn}B_{pn}]\begin{bmatrix} A_{pn} & B_{pn} \\ 0_{1 \times n_{pn}} & 0 \end{bmatrix} = [C_{pn}A_{pn}^3\ C_{pn}A_{pn}^2 B_{pn}]$$

$$\ldots$$

$$CA^{n-2} = [C_{pn}A_{pn}^{n-3}\ C_{pn}A_{pn}^{n-4}B_{pn}]\begin{bmatrix} A_{pn} & B_{pn} \\ 0_{1 \times n_{pn}} & 0 \end{bmatrix}$$

$$= [C_{pn}A_{pn}^{n-2}\ C_{pn}A_{pn}^{n-3}B_{pn}] = [C_{pn}A_{pn}^{n_{pn}-1}\ C_{pn}A_{pn}^{n_{pn}-2}B_{pn}]$$

$$CA^{n-1} = [C_{pn}A_{pn}^{n-2}\ C_{pn}A_{pn}^{n-3}B_{pn}]\begin{bmatrix} A_{pn} & B_{pn} \\ 0_{1 \times n_{pn}} & 0 \end{bmatrix}$$

$$= [C_{pn}A_{pn}^{n-1}\ C_{pn}A_{pn}^{n-2}B_{pn}] = [C_{pn}A_{pn}^{n_{pn}}\ C_{pn}A_{pn}^{n_{pn}-1}B_{pn}]$$

-continued $$U_O = \begin{bmatrix} C_{pn} & 0 \\ C_{pn}A_{pn} & C_{pn}B_{pn} \\ \vdots & \vdots \\ C_{pn}A_{pn}^{n_{pn}-1} & C_{pn}A_{pn}^{n_{pn}-2}B_{pn} \\ C_{pn}A_{pn}^{n_{pn}} & C_{pn}A_{pn}^{n_{pn}-1}B_{pn} \end{bmatrix} = \begin{bmatrix} U_{Opn}(n_{pn} \times n_{pn}) & Y \\ C_{pn}A_{pn}^{n_{pn}} & C_{pn}A_{pn}^{n_{pn}-1}B_{pn} \end{bmatrix}$$

[Expression 14]

where $Y=[0,C_{pn}B_{pn}, \ldots, C_{pn}A_{pn}^{n_{pn}-2}B_{pn}]^T$

Here, if Expression 15 that is a formula (see Kosato, Mita: Guide to system control theory, Jikkyo Shuppan Co., Ltd., 1979) is utilized, the determinant of Expression 12 can be represented as Expression 16 from Expression 4.

$$\det\begin{bmatrix} X & Y \\ Z & W \end{bmatrix} = \det(X) \cdot \det(W - ZX^{-1}Y) \text{ for } \det(X) \neq 0$$

[Expression 15]

$$\det(U_O) = \det(U_{Opn}) \cdot \det(C_{pn}A_{pn}^{n-1}B_{pn} - C_{pn}A_{pn}^{n_{pn}} \cdot U_{Opn}^{-1} \cdot Y)$$

[Expression 16]

If these values are not zero, Expressions 15 and 16 are observable, and thus an observer can be designed.

Next, a pole of an expansion system and controllability will be described.

A pole increased by preparing an expansion system will be confirmed. A formula for a determinant (see Kosato, Mita: Guide to system control theory, Jikkyo Shuppan Co., Ltd., 1979)

$$\det\begin{bmatrix} X & Y \\ 0 & W \end{bmatrix} = \det(X) \cdot \det(W)$$

[Expression 17]

is used, from Expression 7, since the pole of the expression system is s satisfying Expression 18, $$\det(sI - A) = \det\begin{bmatrix} sI_{pn} - A_{pn} & -B_{pn} \\ 0_{1 \times n_{pn}} & s \end{bmatrix} =$$
$$\det(sI_{pn} - A_{pn}) \cdot \det(s) = \det(sI_{pn} - A_{pn}) \cdot s = 0$$

[Expression 18]

it is seen that it consists of a pole and the origin of an original nominal model.

In the case of a one-input and one-output system, an unchanged zero point in the modern control theory and a zero point (=transfer zero point) in the classic control theory coincide with each other and uncontrollability and unobservability occur with a pole and a zero point coinciding with each other (see Kosato, Mita: Guide to system control theory, Jikkyo Shuppan Co., Ltd., 1979).

Incidentally, it can be seen without checking a controllable matrix that this expansion system is uncontrollable. This is because a disturbance is deliberately treated as one of state amounts despite the fact that it is physically one of inputs and its origin pole cannot be altered by control input as is seen from the block diagram in the upper part of FIG. 1.

It is confirmed that a necessary and sufficient condition of controllability is that, in the case of a one-output system, a rank of a controllable matrix $U_c(n \times n)$ of Expression 19 is n.

$$U_c = [B, AB, A^2B, \ldots, A^{n-1}B]$$

[Expression 19]

That is, Expression 20 must be established.

$$\det(U_c) \neq 0$$

[Expression 20]

When Expression 20 is expanded, Expression 21 is found utilizing Expression 17.

$$\det(U_C) =$$
$$\det\begin{bmatrix} B_{pn} & A_{pn}B_{pn} & \cdots & A_{pn}^{n_{pn}-1}B_{pn} & A_{pn}^{n_{pn}}B_{pn} \\ 0 & 0 & 0 & 0 & 0 \end{bmatrix} =$$
$$\det\begin{bmatrix} U_{Cpn} & A_{pn}^{n_{pn}}B_{pn} \\ 0_{1 \times n_{pn}} & 0 \end{bmatrix} = \det(U_{Cpn}) \cdot 0 = 0$$

[Expression 21]

Therefore, Expression 20 is uncontrollable. In Expression 18, since the pole of the expansion system consists of a pole and the origin of a nominal system and, moreover, the nominal system is controllable, a pole that causes uncontrollability, that is, an uncontrollable pole is only the origin 0.

To supplement the above, since the expansion system is used as a tool for designing an observer and is not used for designing a compensator, these expansion systems Expressions 7 and 8 may be uncontrollable.

Next, conditions of observability will be described.

Since there is a case in which an uncontrollable pole simultaneously becomes an unobservable pole, evaluation of observability is necessary.

(Case 1)

It is assumed that there is a positive integer q and $$C_{pn}B_{pn} = C_{pn}A_{pn}B_{pn} = \ldots = C_{pn}A_{pn}^{q-2}B_{pn} = 0,$$
$$C_{pn}A_{pn}^{q-1}B_{pn} \neq 0, \quad q \leq n_{pn}$$

[Expression 22]

is established. It is known that, in a one-input and one-output system, $r = n_{pn} - q$ represents the number of zero points (Furuta, Kawaji, Mita, Hara: Mechanical system control, Ohmsha Ltd., 1984).

If $r = n_{pn} - q = 0$ by chance in a nominal mode, since there is no zero point in the nominal model itself and the Y matrix becomes the 0 matrix, the following formula Expression 23 can be used for an expansion system (see Kosato, Mita: Guide to system control theory, Jikkyo Shuppan Co., Ltd., 1979), $$\det\begin{bmatrix} W & 0 \\ Z & W \end{bmatrix} = \det(X) \cdot \det(W) \quad \text{[Expression 23]}$$

From Expressions 6, 22 and 23, $$\det(U_O) = \det(U_{Opn}) \cdot \det(C_{pn} A_{pn}^{n_{pn}-1} B_{pn}) \neq 0 \quad \text{[Expression 24]}$$

and the expansion system Expressions 7 and 8 becomes observable.

(Case 2)

If $r = N_{pn} - q > 0$, that is, there are one or more zero points in a nominal model itself, it is necessary to confirm that an origin pole is not turned into an unobservable pole and there is no other way but to directly check Expression 16.

Next, a method of designing a disturbance observer will be described.

An observer is designed using the expansion systems Expressions 7 and 8.

(Design of an Identical Dimension Disturbance Observer)

$$\dot{\hat{x}} = A\hat{x} + Bu - K(C\hat{x} - y) = (A - KC)\hat{x} + Bu + Ky \quad \text{[Expression 25]}$$

where $$\hat{x} = \begin{bmatrix} \hat{x}_{pn} \\ \hat{x}_d \end{bmatrix}, A = \begin{bmatrix} A_{pn} & B_{pn} \\ 0_{1 \times n_{pn}} & 0 \end{bmatrix}, B = \begin{bmatrix} B_{pn} \\ 0 \end{bmatrix}, C = [C_{pn}\ 0], K = \begin{bmatrix} k_{pn} \\ k_d \end{bmatrix}$$

Figure 2:
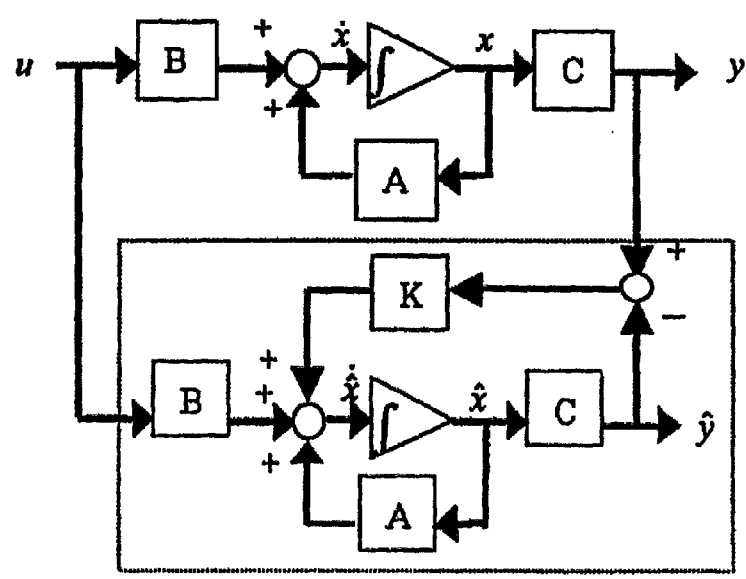
FIG. 2 is a block diagram of a control object model and an observer.

$\hat{x} \in R^{n \times 1}, A \in R^{n \times n}, B \in R^{n \times 1}, C \in R^{1 \times n}, K \in R^{n \times 1}, K_{pn} \in R^{n_{pn} \times 1}, n = n_{pn} + 1$ and K is selected such that real parts of all peculiar values of the A-KC matrix of Expression 25 become negative. A block diagram of a control object model and an observer is shown in FIG. 2. In FIG. 2, an input u is, for example, a displacement control command value and an output y is a detected temperature of the outlet of the evaporator 51.

(Design of a Minimum Dimension Observer)

A designing method called a nonsingular form of Gopinath may be used for designing the observer.

(Observer of a Digital Format)

The expansion system Expressions 7 and 8 may be discretized with a zero-th dimension hold as a premise and designed as an identical dimension observer of a digital format or a minimum dimension observer.

Next, utilization in a control system will be described.

Figure 3:
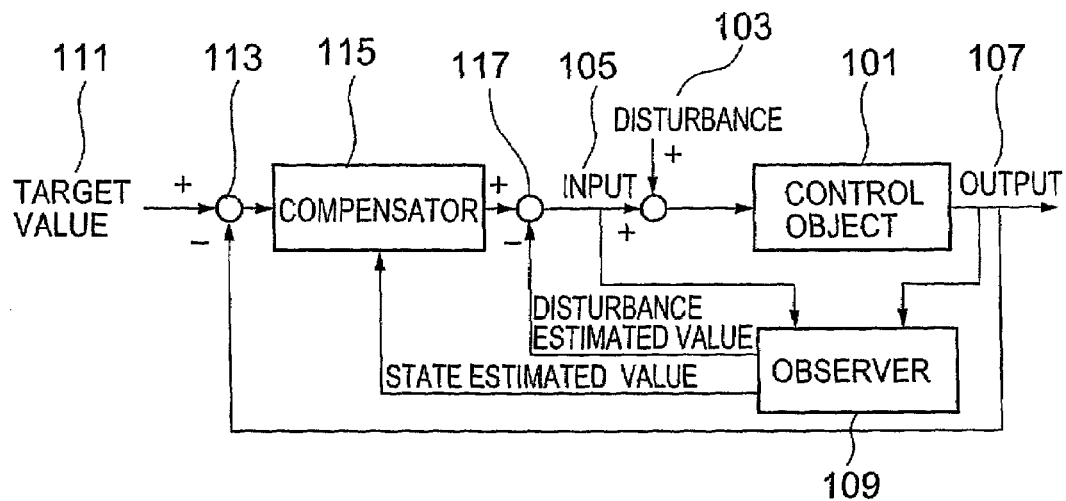
FIG. 3 is a block diagram of a control system.

A block diagram of a control system is shown in FIG. 3. A disturbance 103 is applied to a control object 101. An input signal 105 (e.g., a displacement control command value) and an output signal 107 (e.g., a detected temperature at the outlet of the evaporator 51) are inputted in an observer 109 and a disturbance is estimated.

A deviation between the output signal 107 and a target value 111 is calculated by a subtractor 113. This deviation is subject to compensations such as a state feedback, a servo system of a 1 type and a PID control by a compensator 115 and outputted as a control signal. This control signal is subtracted from a disturbance estimated value from the observer 109 by a subtractor 117.

Therefore, the disturbance estimated value among estimated values of the observer is fed back to cancel an actual disturbance. In addition, compensations such as a state feedback, a servo system of a 1 type and a PID control are performed using another state estimated value.

Next, measures at the unobservable time will be described.

Figure 4:
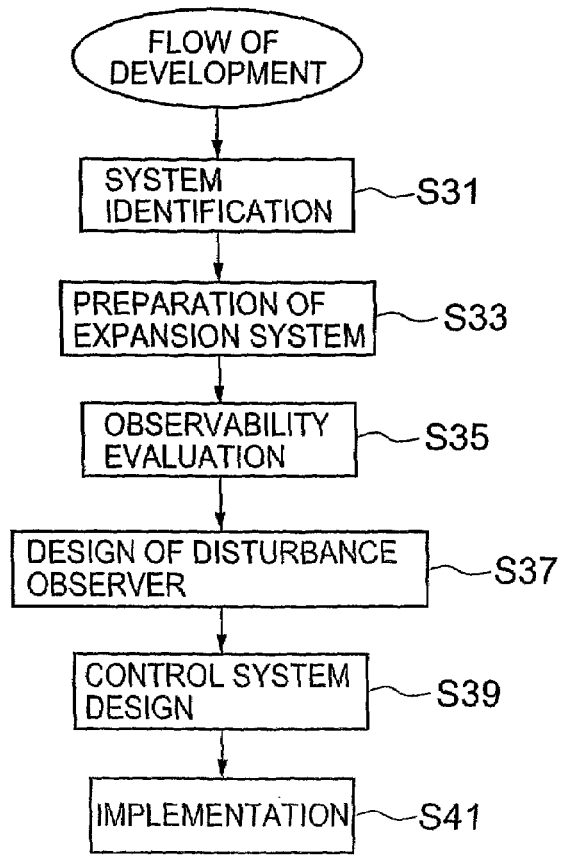
FIG. 4 is flow chart of development.

First, if the above descriptions are arranged as a development procedure, it is as shown in FIG. 4. In a development flow of FIG. 4, a nominal model of a refrigeration air conditioning system is prepared utilizing a system identification technology in step 31. In step 33, an expansion system is configured from the nominal model and a disturbance that is assumed anew.

Next, in step 35, it is determined whether or not the expansion system satisfies observability that is a configuration condition of the observer. If it satisfies observability, a new disturbance observer is designed in step 37. This disturbance observer and a compensator are combined in step 39 and mounted on an actual machine in step 41.

In step 35, if the expansion system does not satisfy observability, unobservability is avoided by deliberately adding a deviation to an identification model. As a method, a constant term of a small value is added to deviate a zero point.

In this way, a refrigeration air conditioning system control system, which is insensitive to a parameter variation caused by a change in a physical property value of air and refrigerant due to a heat load variation or a change in a refrigerant flow due to a change in a rotating speed, can be realized with a fixed compensator having a simple structure.

Further, a specific method of system identification will be described for reference.

System identification means preparing some "mathematical model" that can prove that a system is "identical" with an object under a certain "purpose" from a measured value of input and output data of a dynamic system to be an object. System identification intended to be performed in the present invention is "system identification for the purpose of control" and several methods have been established.

Figure 5:
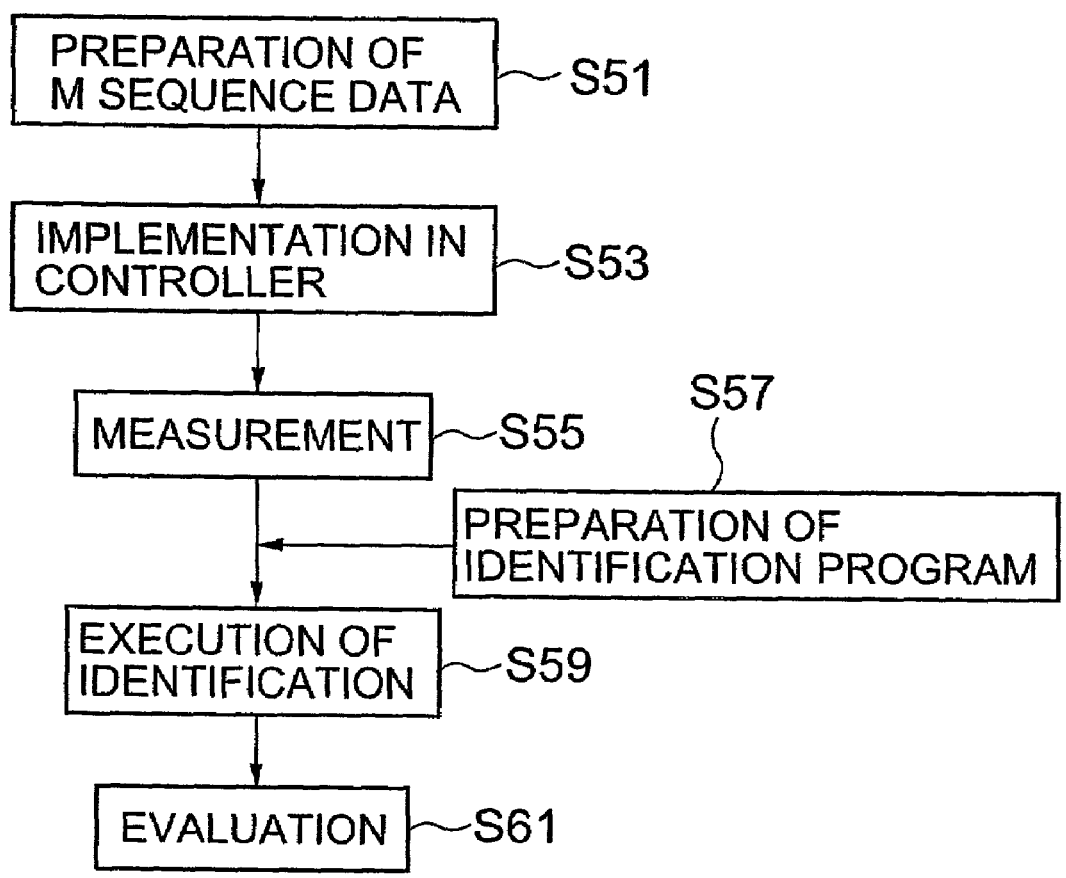
FIG. 5 is flow chart of procedure of system identification.

A procedure for system identification follows a flow of FIG. 5. In step 51, M sequence data is prepared. Next, in step 53, implementation in a controller is performed and, in step 55, measurement is performed and the data is stored. In step 57, an identification program is prepared and, instep 59, identification is executed. More specifically, $A_{pn}$, $B_{pn}$ and $C_{pn}$ are found.

Then, in step 61, the found $A_{pn}$, $B_{pn}$ and $C_{pn}$ are evaluated. If an evaluation result is displeasing, the identification program is revised and the identification work is executed again to perform evaluation again. In addition, it becomes necessary to repeatedly perform identification with respect to a control object with significantly changing environmental conditions by changing an amplitude, a cycle and a length of the M sequence data in various ways. Next, preparation of the M sequence data will be described.

Figure 6:
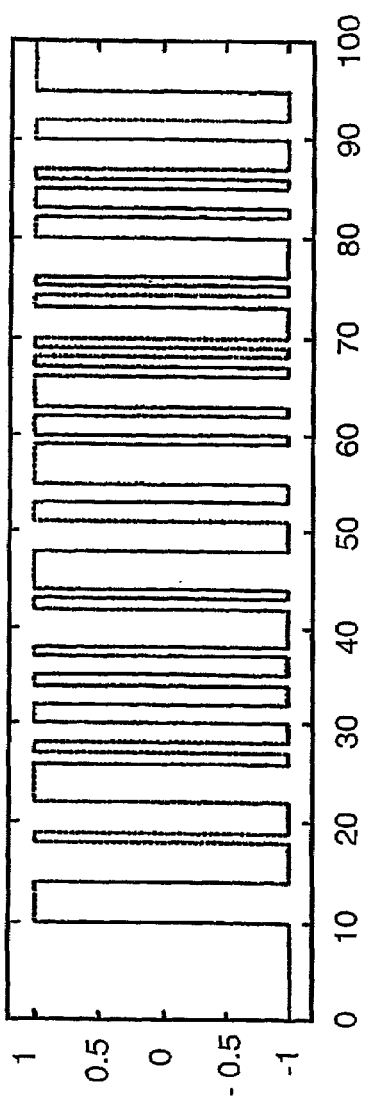
FIG. 6 is an example of an M sequence signal.

For system identification, Pseudo Random Binary Signals (PRBSs) are inputted in a control object and an output is observed. Among the signals to be inputted, most frequently utilized signal is an M sequence signal (Maximum-length linear shift register sequence). An example is shown in FIG. 6.

Figure 7:
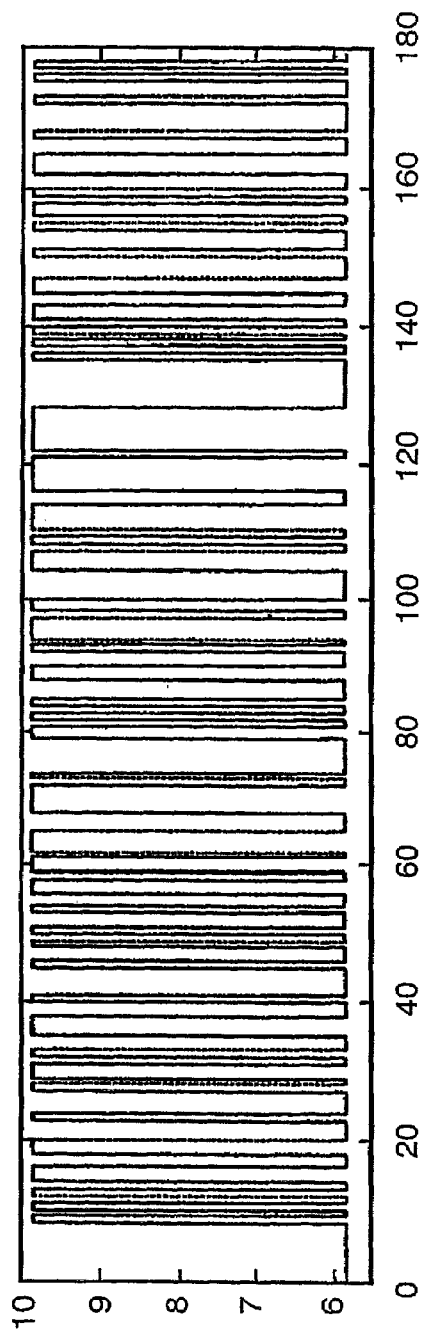
FIG. 7 is an example of an M sequence data used in refrigeration system control.

Next, a specification of the M sequence signal in the case in which it is actually used for refrigeration system control will be considered. An example of the M sequence data used for refrigeration system control is shown in FIG. 7. FIG. 7 shows data strings in which 0 to 10 are command voltages corresponding to a driving current zero to maximum current of the displacement varying mechanism 30 and is an M sequence signal deflected upward and downward by an amplitude 2 with a heat load as a medium load and with an average command value 7.85 at the time when a rotating speed of the variable displacement type gas compressor 10 is 800 rpm as an average value.

As the average value, a balanced point of inputs at the time when a target temperature coincides with an air temperature under a condition that a heat load and a rotating speed of the variable displacement type gas compressor 10 are regulated is used. Since the amplitude depends on nonlinear evaluation, increasing and decreasing of the amplitude are attempted in a try and error manner. However, the amplitude of less than zero or more than ten is unacceptable because it causes saturation, the average value is deviated so as to avoid saturation.

Figure 8:
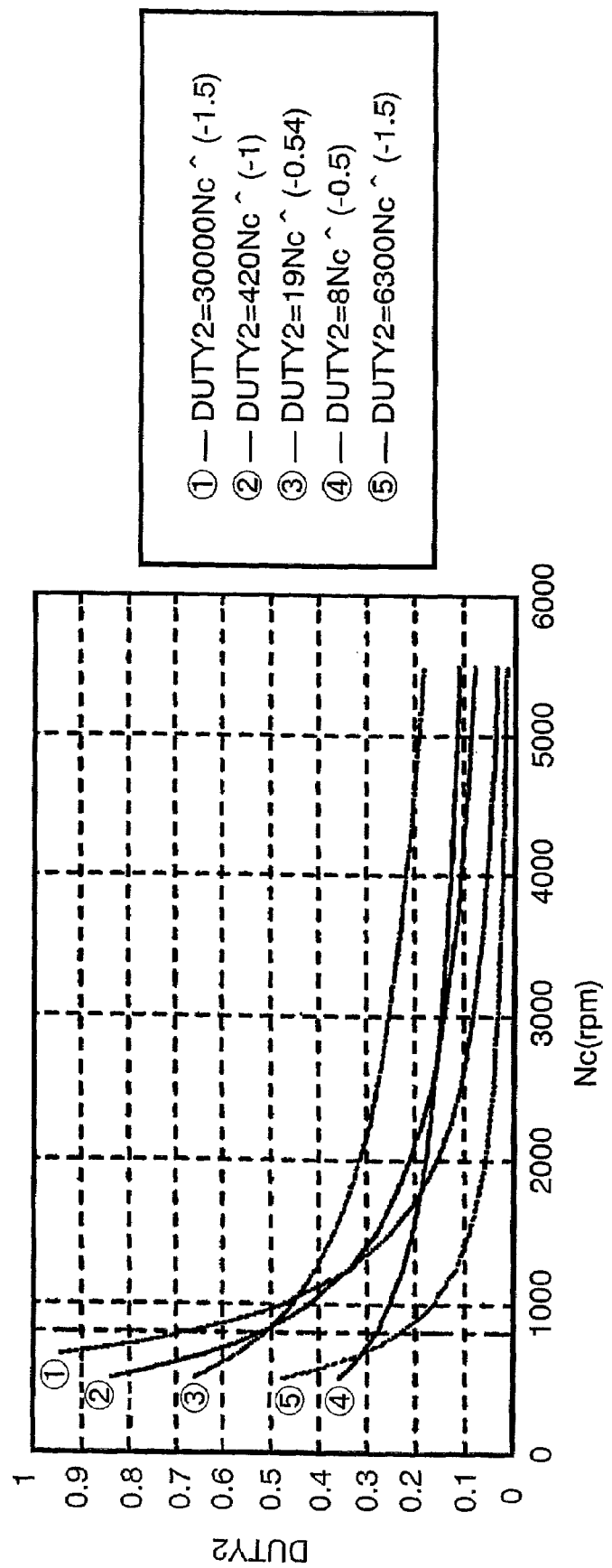
FIG. 8 is a relation between a rotating speed with respect to environmental conditions and a displacement ratio at a balanced point.

FIG. 8 shows a relation between a displacement ratio (=Duty 2) and a rotating speed at the balanced point in five kinds of environmental conditions.

In a temperature control system, this value may be used as a feed forward value corresponding to a rotating speed.

Incidentally, 0 to 10 used in the above-described M sequence correspond to the 0 to 1. Thus, for example, since a value at the time of operation at a rotating speed 800 rpm under the environmental conditions of (1) is approximately 0.7, it is sufficient to use 7 that is ten times as large as the value as the average value. Besides, if temperature control is attained for the time being, a balanced point at the time of control may be used.

Next, implementation in a controller and execution will be described.

The controller outputs an M sequence signal as a voltage. Then, this M sequence signal is given as a control input to the displacement varying mechanism 30 of the variable displacement type gas compressor 10 that is a control object. A resulting air temperature at an outlet of an evaporator is detected in the form of a voltage and captured in the controller.

Figure 9:
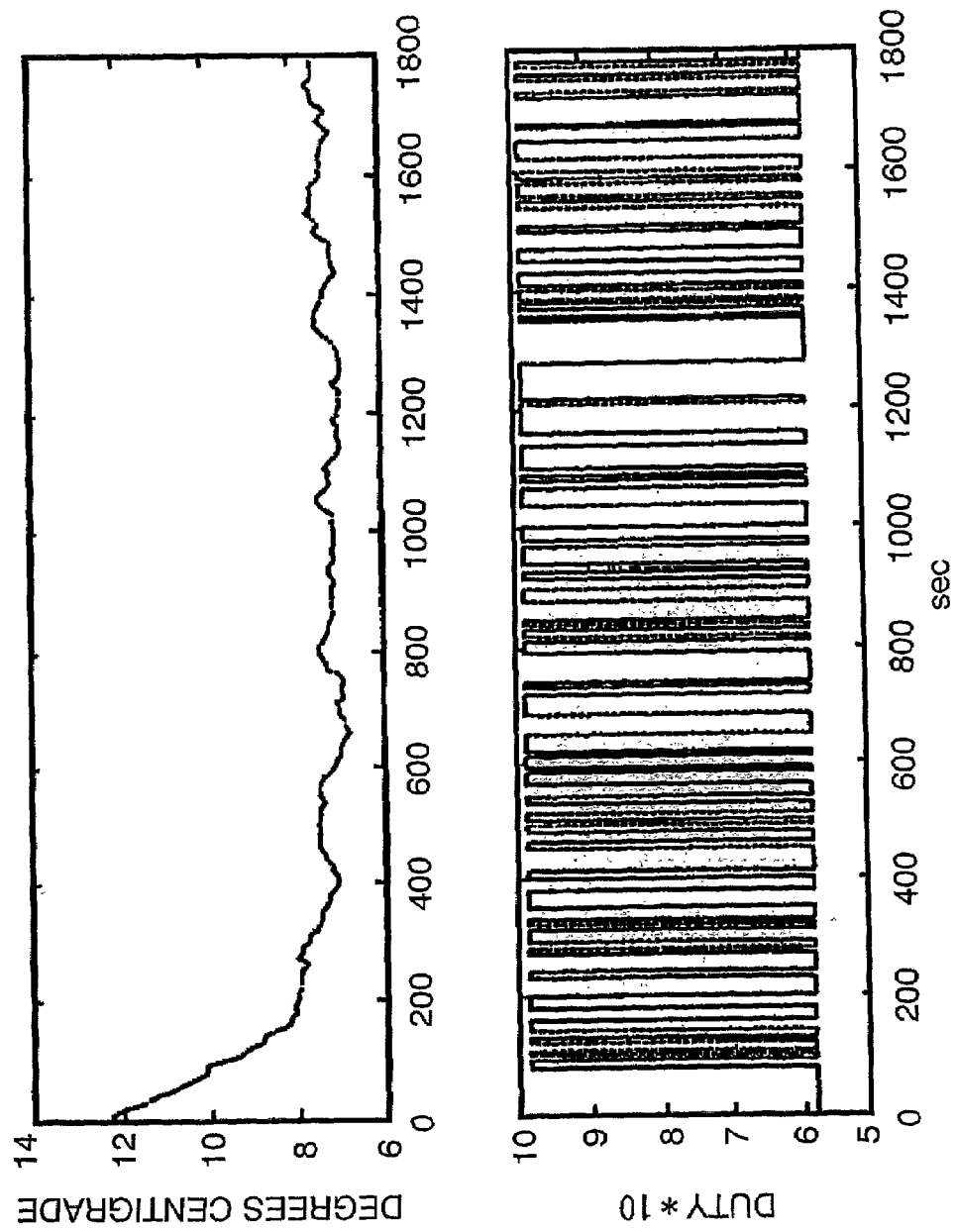
FIG. 9 is an example of input and output data.
Figure 10:
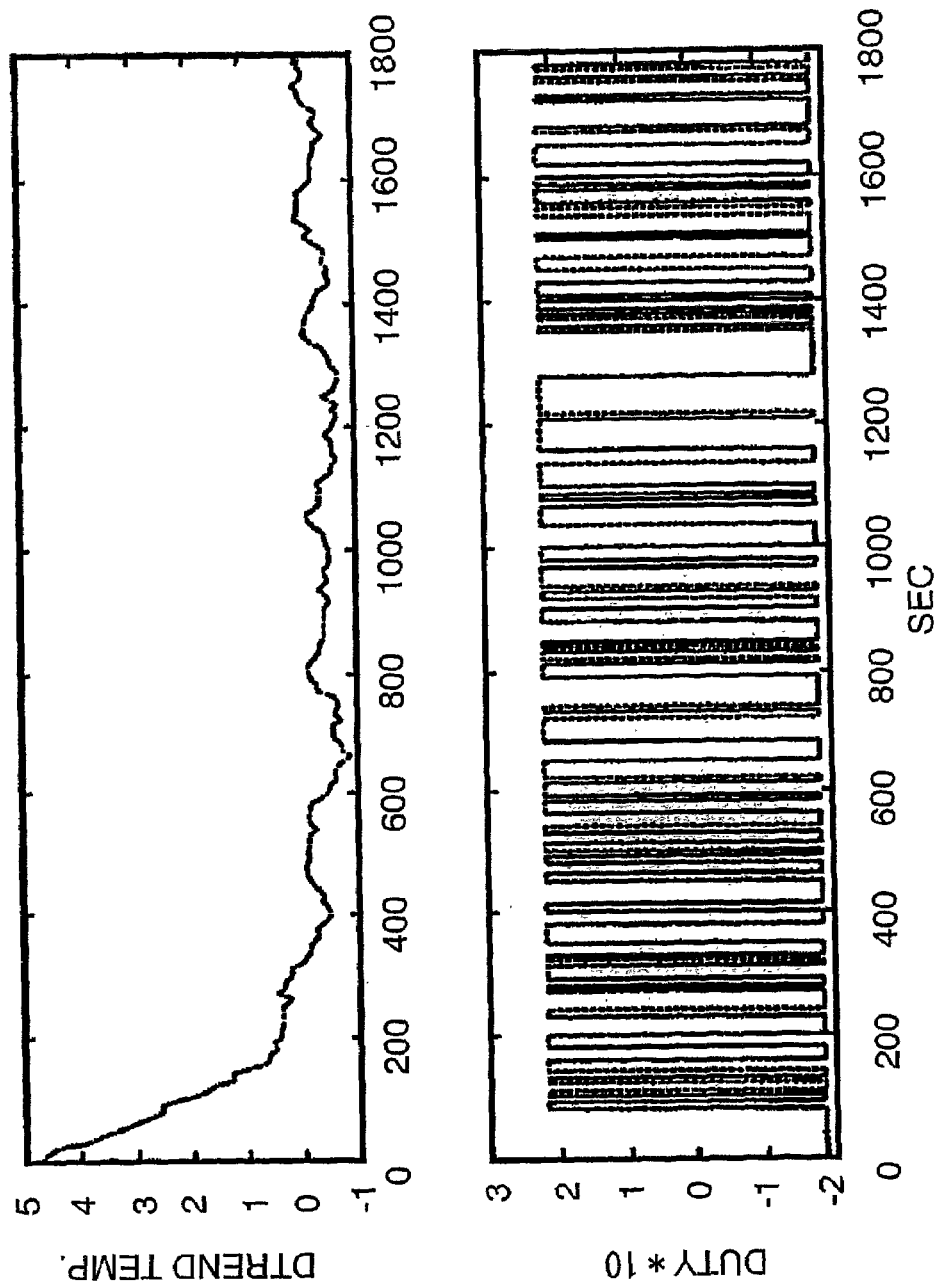
FIG. 10 is an example of detrended input and output data.

Results of input and output in an identification experiment using a control bench are shown in FIG. 9. On the other hand, an average value of input and output is eliminated as shown in FIG. 10. That is, an average is zero. System identification calculation is performed based on this result and A, B and C matrixes of a state equation are obtained.

Figure 11:
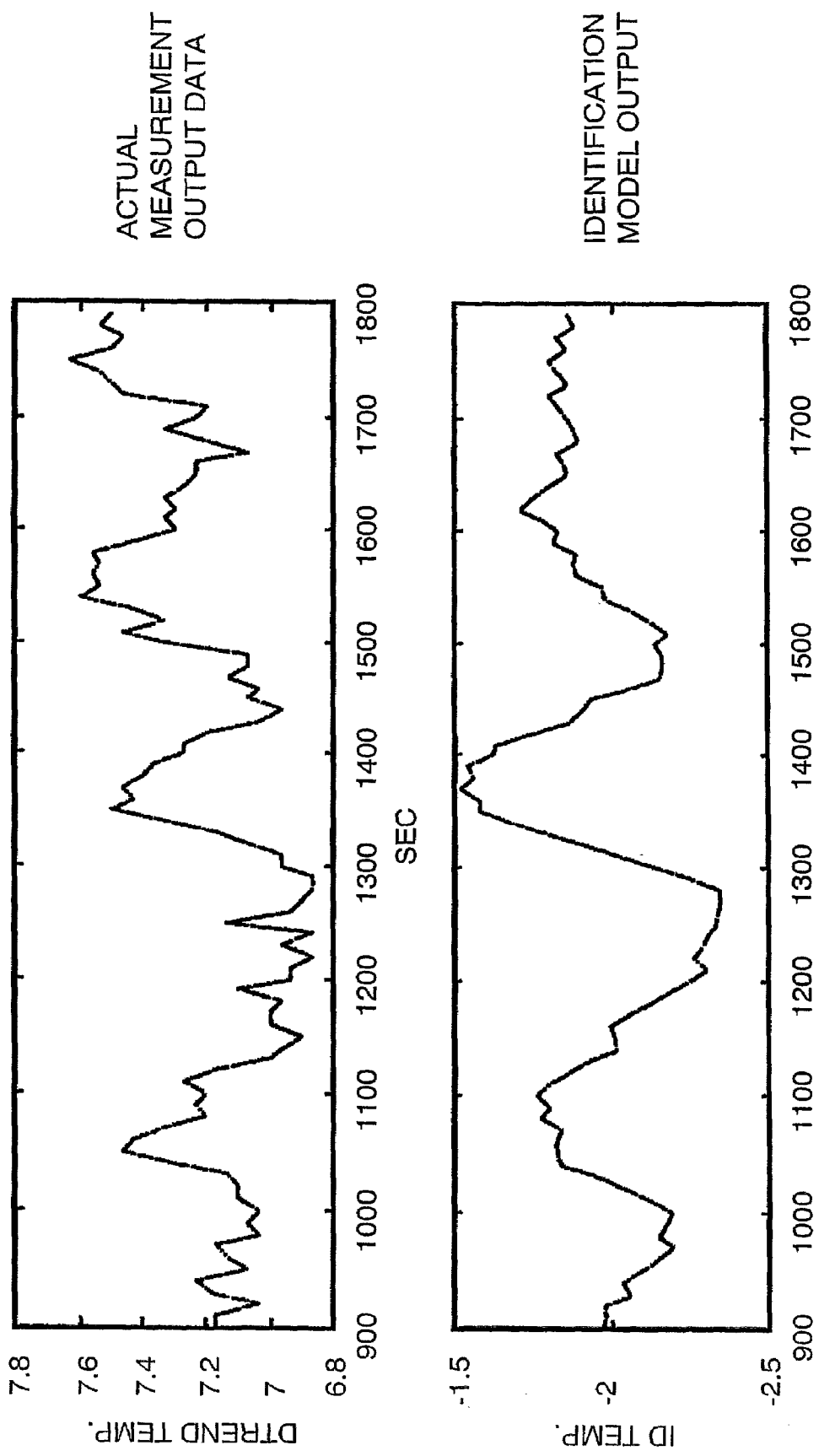
FIG. 11 is an example of an evaluation result.
Figure 12:
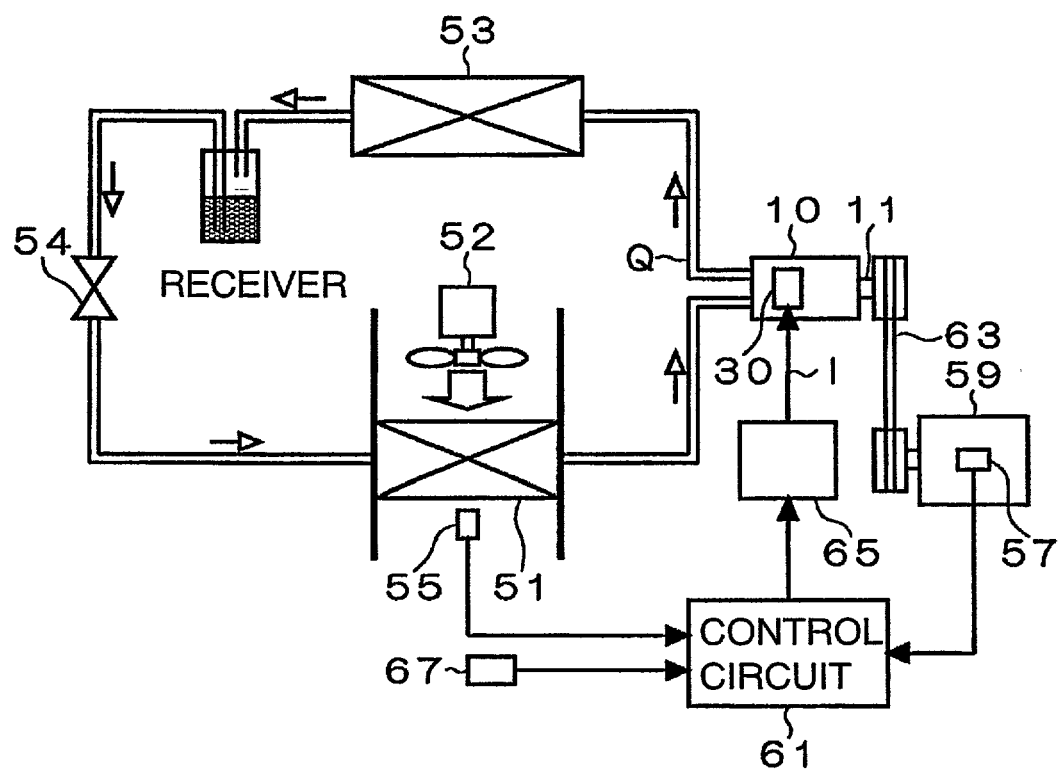
FIG. 12 is a schematic view showing an entire configuration of an air conditioning system.
Figure 13:
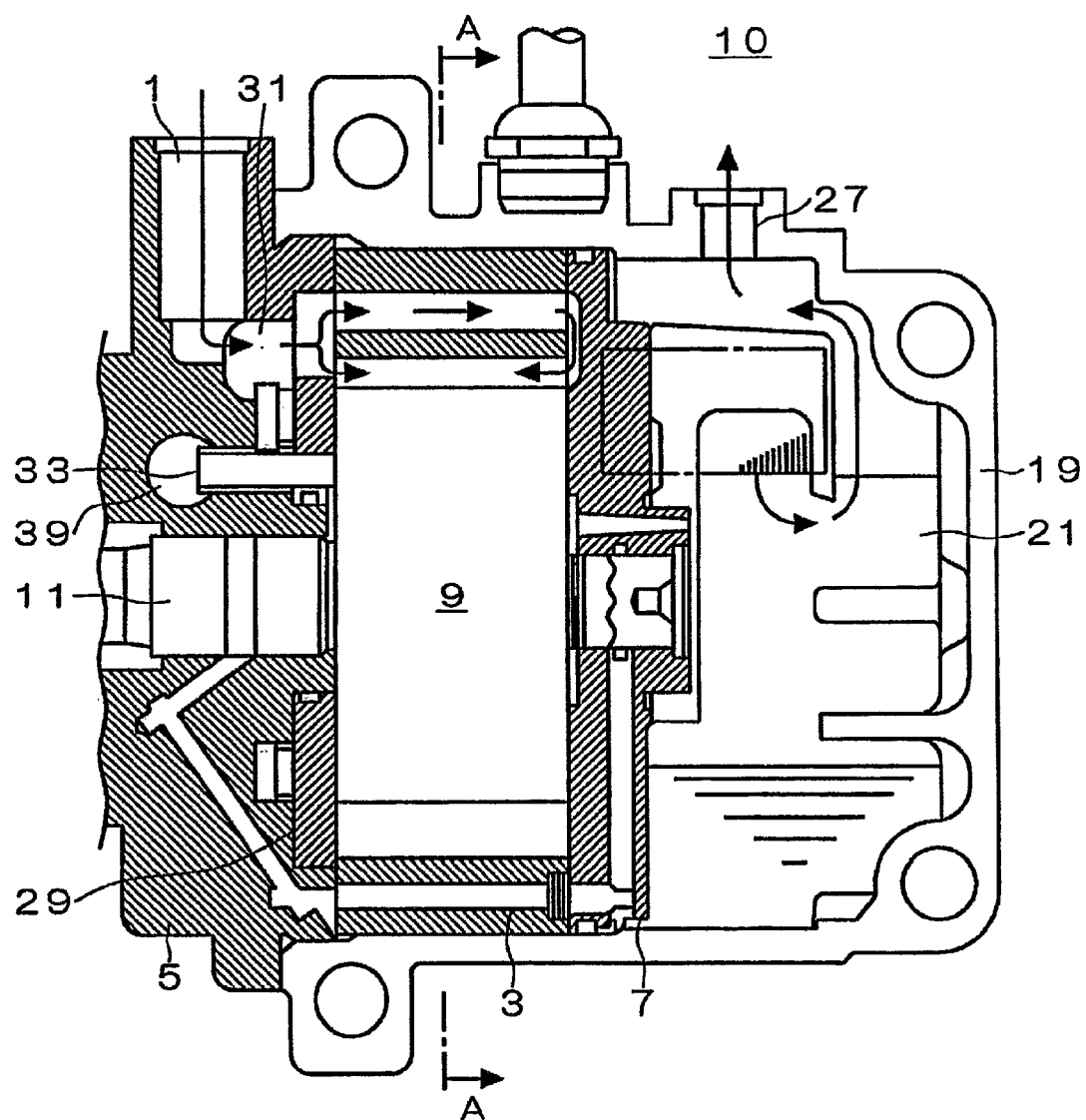
FIG. 13 is a sectional view of a variable displacement type gas compressor.
Figure 14:
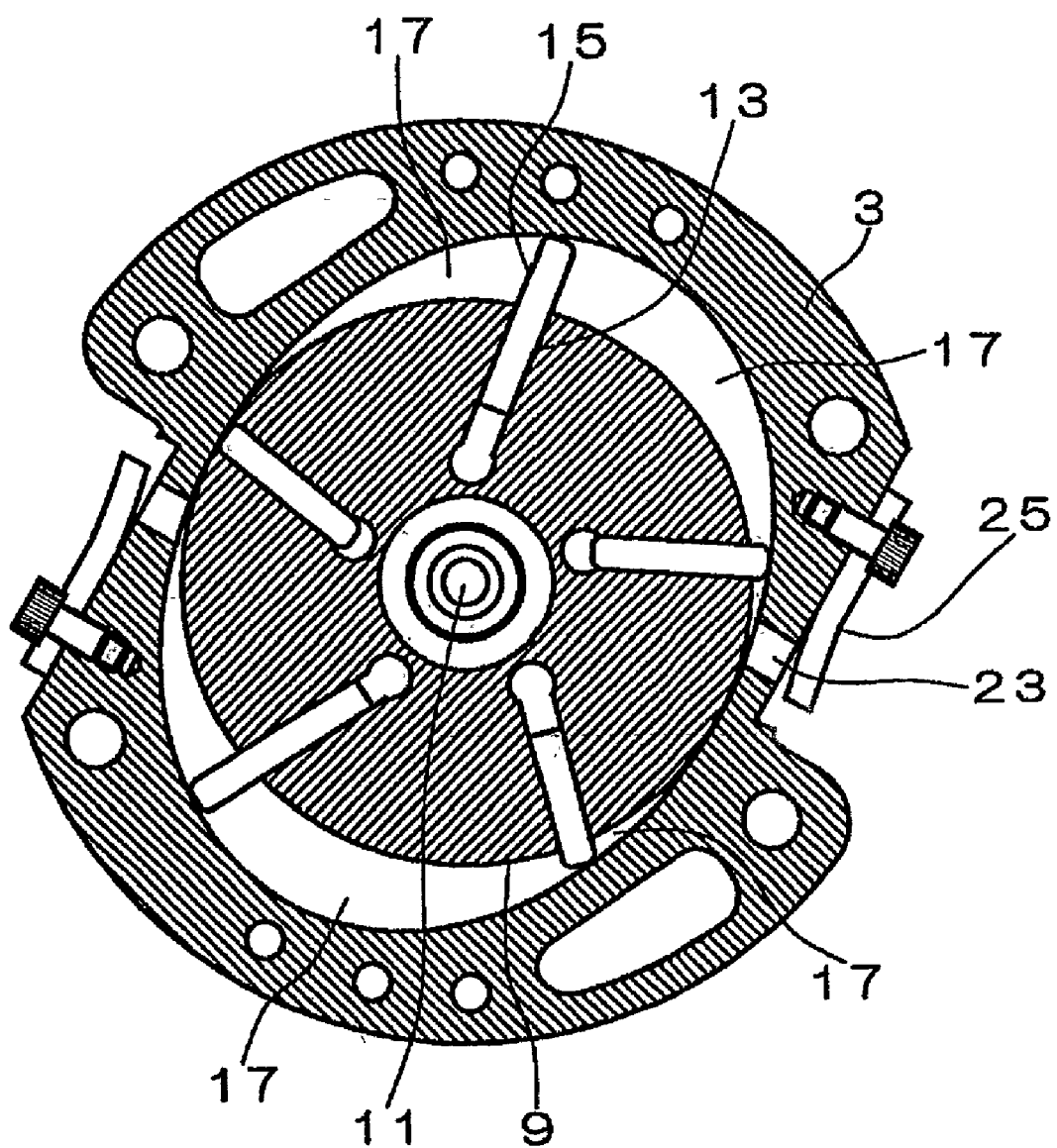
FIG. 14 is a sectional view cut along line A—A and viewed in the direction of arrows A in FIG. 13.
Figure 15:
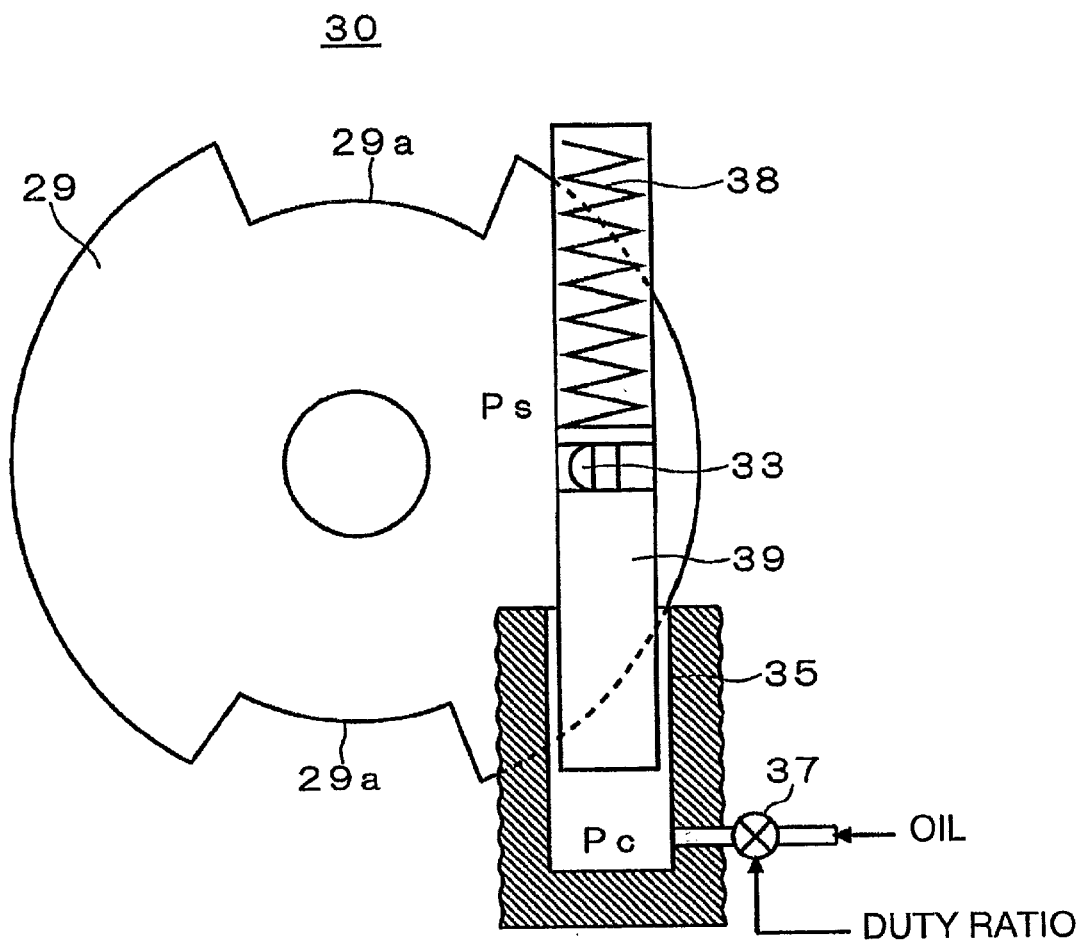
FIG. 15 is an example of a configuration of a displacement varying mechanism.
Figure 16:
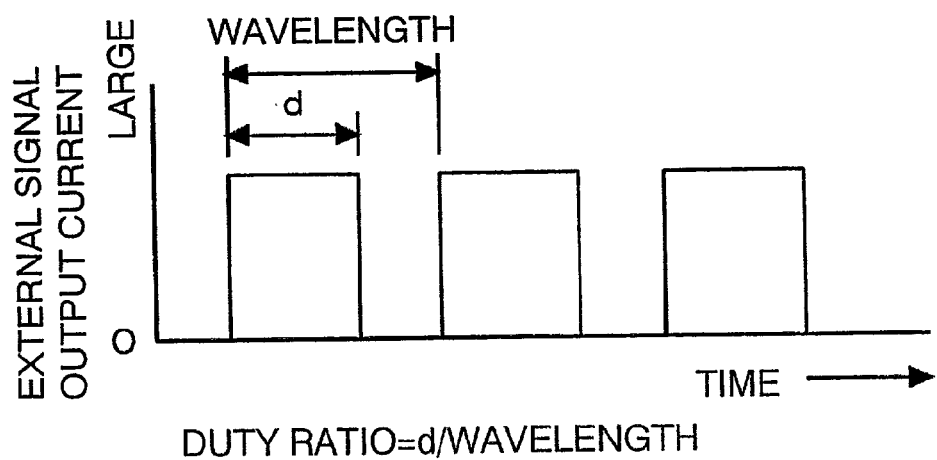
FIG. 16 is a displacement control command values (Duty ratios).
Figure 17:
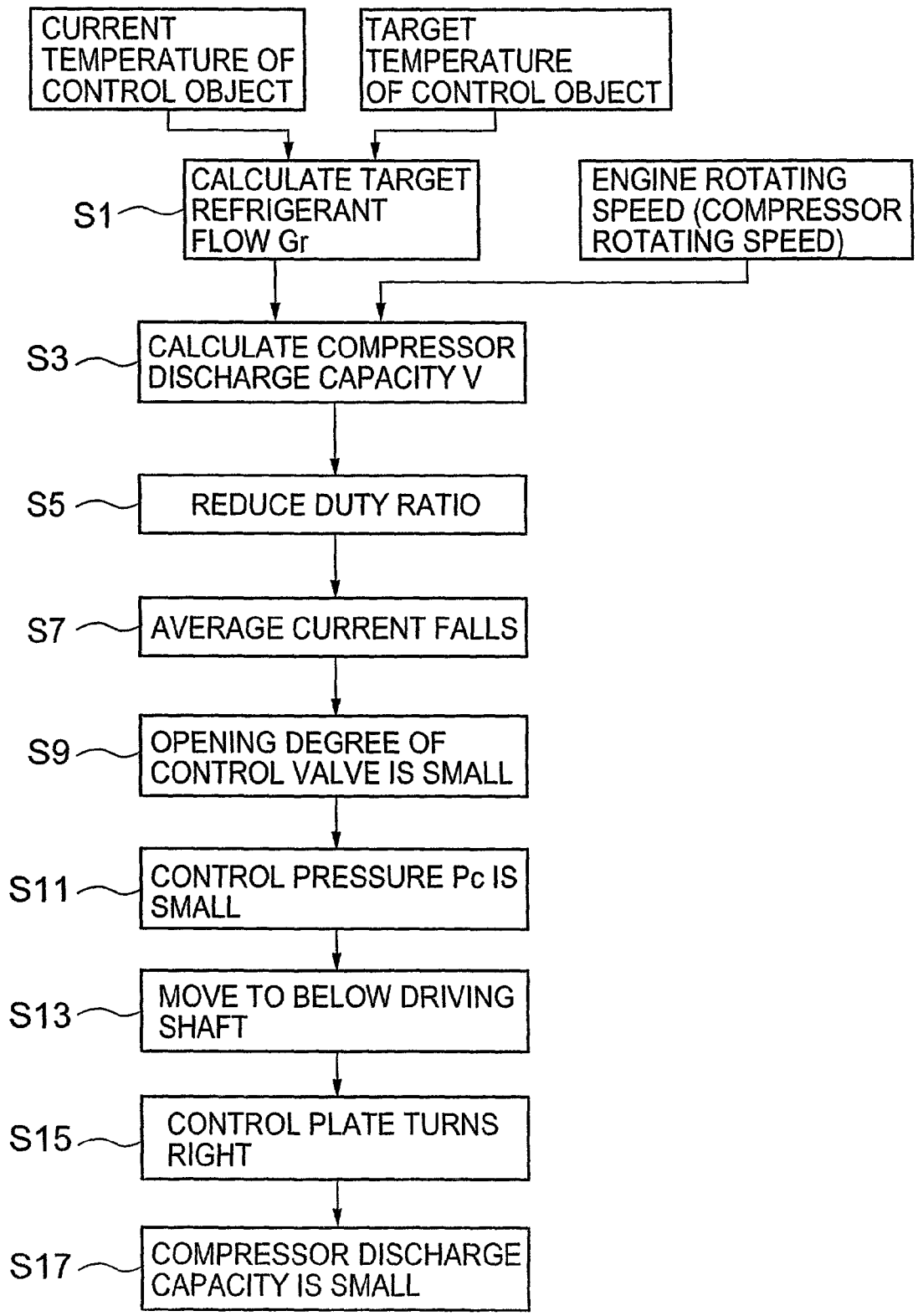
FIG. 17 is flow chart of control method of displacement varying mechanism.

Next, as shown in FIG. 11 as an evaluation result, validity of an obtained mathematical model can be confirmed by comparing an actual output and an output at the time when an identical M sequence signal input is given to an identical model.

As reference documents, there are the following.
1) L. Liung: System Identification Tool box User's Guide, Math Works (translation supervised by Shuichi Adachi)
2) Shuichi Adachi: System identification for control by MATLAB, Tokyo Denki University Press, 1996
3) Kiyoshi Wada: Commentary "What is the partial space identification method?", Keisoku to Seigyo 36–8, PP.569–674, 1997

As described above, according to the present invention, a control system that is insensitive to a parameter variation caused by a change of a physical property value or the like can be realized with a fixed compensator having a simple structure.

What is claimed is:

1. A disturbance estimated-type control system comprising:
   a variable displacement-type gas compressor based on a mathematical model comprised of one of a state equation and a transfer function and prepared by system identification technology;
   disturbance estimating means based on an expansion system based on the mathematical model for estimating a disturbance of the variable displacement-type gas compressor in accordance with an input signal inputted into the variable displacement-type gas compressor and a detection signal detected from the variable displacement-type gas compressor;
   compensating means based on the mathematical model for compensating for a deviation between the detection signal and a target value and for outputting a corresponding control signal; and
   subtracting means for subtracting the control signal of the compensating means from a disturbance estimated value of the disturbance estimating means.

2. A gas compressor control system comprising:
   a variable displacement type gas compressor having a compression chamber and displacement altering means for altering a displacement of gas in the compression chamber and being based on a mathematical model comprised of one of a state equation and a transfer function and prepared by system identification technology;
   input means for inputting an input signal into the displacement altering means;
   detecting means for detecting a detection signal corresponding to one of ambient air temperature, air temperature at an outlet of an evaporator, a flow of a refrigerant flowing through the variable displacement type gas compressor, and a pressure of the refrigerant on a suction side of the compressing chamber;
   disturbance estimating means based on an expansion system based on the mathematical model for estimating a disturbance of the variable displacement type gas compressor in accordance with the detection signal detected by the detecting means and the input signal input into the displacement altering means;
   compensating means based on the mathematical model for compensating for a deviation between the detection signal and a target value and for outputting a corresponding control signal; and
   subtracting means for subtracting the control signal of the compensating means from a disturbance estimated value of the disturbance estimating means.

3. A method of designing a disturbance estimatedtype control system, comprising the steps of:
   providing a control object;
   preparing a mathematical model of the control object by inputting a control signal into the control object, measuring an output signal from the control object resulting from the control signal inputted into the control object, and performing, based on the output signal, identification with an identification program to establish an evaluation, the mathematical model comprising one of a state equation and a transfer function;
   providing an expanded state equation based on the mathematical model of the control object and a mathematical model of a disturbance;
   designing from the expanded state equation a disturbance estimating device for estimating a disturbance of the control object in accordance with an input signal inputted into the control object and a detection signal detected from the control object;
   designing from the mathematical model of the control object a compensating device for compensating for a deviation between the detection signal and a target value and for outputting a control signal; and subtracting the control signal of the compensating device from a disturbance estimated value of the disturbance estimating device.

4. A method of designing a disturbance estimated-type control system, comprising the steps of:

providing a control object;

preparing a mathematical model of the control object by inputting a control signal into the control object, measuring an output signal from the control object resulting from the control signal inputted into the control object, and performing, based on the output signal, identification with an identification program to establish an evaluation;

providing an expanded state equation based on the mathematical model of the control object and a mathematical model of a disturbance;

designing from the expanded state equation a disturbance estimating device for estimating the disturbance of the control object in accordance with an input signal inputted into the control object and a detection signal detected from the control object;

designing from the mathematical model of the control object a compensating device for compensating for a deviation between the detection signal and a target value and for outputting a control signal;

subtracting the control signal of the compensating device from a disturbance estimated value of the disturbance estimating device; and determining whether or not the expanded state equation is observable and, if it is determined to be unobservable, compulsorily adding an error of 10% or less to a coefficient corresponding to an A matrix and/or a C matrix of the expanded state equation or to a zero-th dimension term of a transfer function numerator of the mathematical model of the control object and preparing an expansion system including the error to thereby establish observability.

5. A gas compressor control system according to claim 2; wherein the disturbance of the variable displacement type gas compressor comprises a variation in the number of rotations of the variable displacement type gas compressor.

6. A disturbance estimated-type control system according to claim 1; wherein the variable displacement-type gas compressor comprises a compression chamber; and wherein the detection signal comprises one of an air temperature at an outlet of an evaporator and a refrigerant pressure on a suction side of the compression chamber.

* * * * *